W. H. BOUTELLE.
TRIAL FRAME.
APPLICATION FILED JULY 29, 1919.
1,375,669.
Patented Apr. 26, 1921.
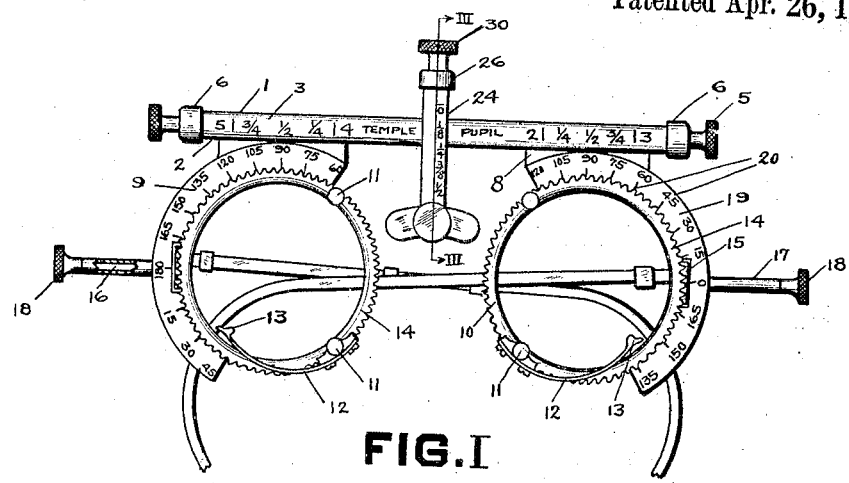
FIG. I
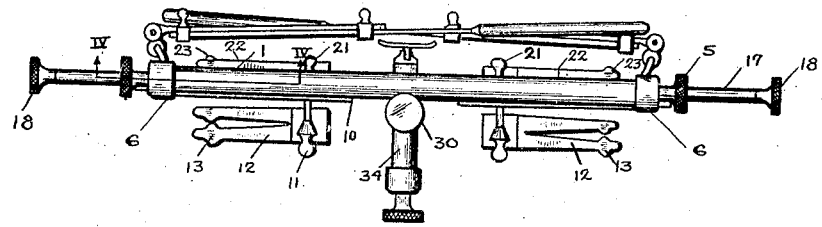
FIG. II
FIG. V.
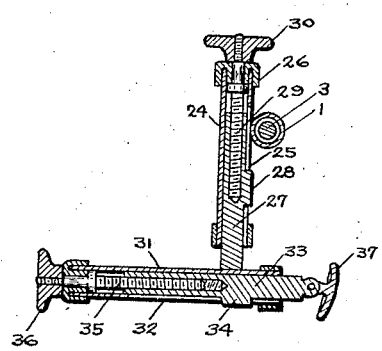
FIG. III
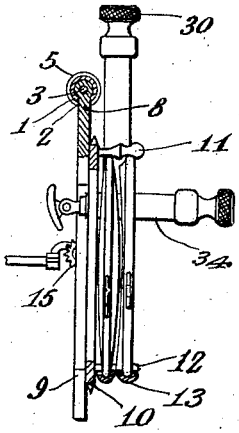
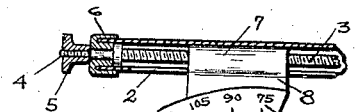
FIG. IV
INVENTOR
W. H. BOUTELLE
BY
H. H. Styll  H. K. Parson
ATTORNEYS

UNITED STATES PATENT OFFICE.

WILLIAM H. BOUTELLE, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

TRIAL-FRAME.

1,375,669.  Specification of Letters Patent.  Patented Apr. 26, 1921.

Application filed July 29, 1919. Serial No. 314,078.

*To all whom it may concern:*

Be it known that I, WILLIAM H. BOUTELLE, a citizen of the United States, residing at Southbridge, in the county of Worcester and State of Massachusetts, have invented certain new and useful Improvements in Trial-Frames, of which the following is a specification.

This invention relates to new and useful improvements in that class of optical instruments known as trial frames which, as the title indicates, are employed in trying lenses in connection with the operation of testing the eyes preparatory to fitting a person with eyeglasses.

Another object of the present invention is the provision of an improved testing or trial frame for the use of the oculist which will be simple, compact and extremely light of weight in construction while yet possessing all desired possibilities of adjustment.

Another object of the present invention is the provision of a trial frame provided with the regular adjustable lens cells which are so connected that they may be simultaneously adjusted and also provided with an adjustable nose bridge adapted for adjustment to accommodate the facial contour of the patient, thus assuring a correct positioning of the frame upon the face.

With the above and other objects in view the invention consists in the novel features of construction, the combination and arrangement of parts hereinafter more fully set forth, pointed out in the claims and shown in the accompanying drawings, in which Figure I is a front elevation of a trial frame constructed in accordance with my invention.

Fig. II is a top plan view, parts thereof being broken away and illustrated in section.

Fig. III is a transverse sectional view taken on the line III—III of Fig. I.

Fig. IV is a similar view taken on the line IV—IV of Fig. II.

Fig. V represents a sectional view through the lens holding mechanism showing trial lenses in position.

Referring now in detail to the drawings in which the various numerals indicate the several parts throughout the views, the numeral 1 indicates the tubular body portion of my improved trial frame which, as illustrated, is of tubular formation provided upon one side thereof with a longitudinal slot indicated at 2, and centrally disposed within this body portion 1 is a rod 3, the ends of which are threaded as shown at 4, and secured in any suitable manner to the outer ends of the rods are the thumb nuts 5 adapted to be grasped to rotate the rod within the body 1. In order to maintain the rod 3 in its correct position within the body 1, I have provided the cap members 6 which are adapted to fit over each end of the body member 1 and provided with central openings through which the rod 3 extends, and the thumb nuts 5 are then secured to the extreme ends of the rod for manipulating the same.

Mounted for longitudinal movement upon the rod 3 and disposed within the body 1 are the sleeves 7 herein shown as disposed in spaced relation and connected by means of the longitudinal body plate 8 to which are secured the lens cells 9. It will be noted from the accompanying drawings that these lens cells 9 and the construction previously described in this paragraph are disposed upon opposite sides of the nose bridge and are identically alike in construction. Supported by each of the cell members 9 is a rotatable member 10, it being apparent from the drawings that the cell 9 is provided with a grooved inner face adapted to receive the convex outer face of the member 10 whereby the member 10 will readily rotate within the cell 9. This rotatable member is provided with the grooved lugs 11, and secured to one of the lugs is a spring member 12, the outer end of which is provided with a retaining tongue 13, and from this it will be apparent that a lens 39 either with or without the metallic protecting frame 40 can be readily fitted within the grooves of the lugs 11 and securely held in position by the spring member 12.

The rotatable ring 10 which is adapted to support the trial lenses is provided upon its exterior with an outwardly depending flange 14 having teeth thereon to provide a substantial gear wheel which is adapted to mesh with the pinion 15. This pinion 15 is secured upon the inner end of a transverse shaft 16 supported within a suitable bearing 17 which is carried by the cell 9, and in order to rotate this shaft a thumb wheel 18 is fixed to the outer end thereof provided with a knurled surface so that the shaft may be readily rotated, which in turn will convey movement, through the pinion, to the member 10. From this it will be apparent that by manipulating the thumb wheel 18 the movable member 10 may be readily rotated within the cell 9.

Secured to the cell 9 is an arcuate plate 19 having upon its outer face a scale 20 for the purpose of ascertaining the correct positioning of the lens before the patient's eyes.

From the construction illustrated it will be readily apparent that I have provided upon the inner face of the cell 9, on the side next to the face of the patient, suitable means whereby a second lens member may be fitted in position. This is done by providing the grooved lug 21 having the spring member 22 attached thereto, extending in arcuate position and having a retaining tongue upon its outer end as indicated at 23.

While I have just described a singular lens holding device in connection with the supporting body member 1 and the adjustable plate 8, it will be apparent that a similar construction is arranged upon the opposite side of the nose bridge, and that both the lens cells are simultaneously adjusted through the rotation of the rod 3. As the sleeves 7 are rotated for sliding movement upon the rod 3 through the medium of the threads 4, it will be apparent that by grasping the thumb nut 5 and rotating the rod 3 these lens supporting members may be readily adjusted toward or away from the nose bridge.

My improved nose bridge, which is shown in connection with the frame member heretofore described, consists of a transverse tubular portion 24 provided with a longitudinal slot as indicated at 25 and closes at its upper end by means of the cap member 26. Fitted within the tube 24 is a sleeve member 27 which extends through the entire length of the sleeve and is provided with interior screw threads, and formed upon the exterior thereof is a longitudinal lug 28 which extends outwardly through the slot in the tube 24 to prevent rotation of the sleeve 27 within the tube 24. Threaded within the sleeve 27 is a rod 29 which extends downwardly through the cap member 26 and is provided at its outer end with a knurled thumb nut 30 to provide for manipulation of this rod.

Secured to the lower end of the sleeve 27 is a transverse tube 31 provided with a longitudinal slot 32 as illustrated, and arranged within this tube 31 for sliding movement is the sleeve 33 having a longitudinal lug 34 to prevent rotation of the sleeve within the tube, and threaded through the sleeve 33 is a rod 35, one end of which is provided with a thumb nut 36 to provide for manipulation of the rod. From this it will be seen that as the sleeve 33 is mounted for sliding movement within the tube 31, the manipulation of the rod 35 will adjust the sleeve 33 within the tube 31. Secured to one end of the sleeve is a movable nose pad 37 and it is for the purpose of adjusting this nose pad 37 to fit the face of the wearer that I provide the adjustable rod 35 which through its manipulation will slide the sleeve 33 within the tube 31 so that the nose pad 37 may be readily adjusted to its proper position.

From the foregoing description taken in connection with the accompanying drawings it will be readily apparent that I have provided a trial frame wherein the construction of the same is such that it is light of weight as compared to the trial frames in use at the present time, but at the same time it possesses all the desired possibilities of adjustment and so forth connected with the usual trial frame. It will be noted that by having the cap member 6 secured to the ends of the tubular body 1 the rod 3 can be readily rotated within the tube 1 through the manipulation of the thumb nuts 5 and the supporting plates 8 may be readily adjusted so that the cells 9 may be adjusted simultaneously toward and away from the nose bridge. It will also be apparent that I have provided suitable means for supporting the lenses in front of the eyes of the patient so that they can be readily removed or placed in position as desired.

I claim:

1. In a trial frame the combination with a cross bar, of a slotted tube secured to and depending from said cross bar, a plunger arm slidable within the tube and having a fin engaged in the slot to secure the plunger against rotation, and an adjusting screw engaged with the plunger for controlling the movement thereof.

2. An adjustable nose rest for a trial frame including a nose rest, a plunger arm secured thereto having a laterally projecting rib, an inclosing tube for the arm having a key-way receiving the rib to hold the same against rotation, an adjusting screw engaging the arm, and means connecting the adjusting screw with the tube for rotation but holding the adjusting screw against longitudinal movement relative to the tube.

3. In a device of the character described, the combination with a cross bar, of a tube secured to and depending from the cross bar, an arm slidable within the tube, means for preventing rotative movement of said arm, an adjusting screw for longitudinally shifting the arm within the tube, a second tube carried by the arm, a nose bearing arm slidable within the second tube, means for holding the second tube against rotation, and an adjusting screw for longitudinally shifting the nose rest arm within its tube.

In testimony whereof I have affixed my signature, in presence of two witnesses.

WILLIAM H. BOUTELLE.

Witnesses:
H. E. COLEMAN,
A. M. DELEHANTY.